United States Patent
Fou

(10) Patent No.: US 11,562,084 B2
(45) Date of Patent: Jan. 24, 2023

(54) SYSTEM AND METHOD FOR SECURE, TRUSTFUL INTERNET INTERACTIONS

(71) Applicant: Augustine Fou, New York, NY (US)

(72) Inventor: Augustine Fou, New York, NY (US)

(*) Notice: Subject to any disclaimer, the term of this patent is extended or adjusted under 35 U.S.C. 154(b) by 54 days.

(21) Appl. No.: 17/166,618

(22) Filed: Feb. 3, 2021

(65) Prior Publication Data

US 2021/0192064 A1    Jun. 24, 2021

Related U.S. Application Data

(63) Continuation-in-part of application No. 16/721,233, filed on Dec. 19, 2019, now Pat. No. 11,516,192.

(51) Int. Cl.
*G06F 21/62* (2013.01)
*G06Q 20/14* (2012.01)

(52) U.S. Cl.
CPC ............ *G06F 21/62* (2013.01); *G06Q 20/14* (2013.01)

(58) Field of Classification Search
None
See application file for complete search history.

(56) References Cited

U.S. PATENT DOCUMENTS

| | | | | |
|---|---|---|---|---|
| 5,712,979 | A * | 1/1998 | Graber | G06F 11/3495 709/224 |
| 10,671,854 | B1 * | 6/2020 | Mahyar | G06N 3/0427 |
| 2011/0078765 | A1 * | 3/2011 | Roskind | H04L 9/321 726/3 |
| 2012/0331088 | A1 * | 12/2012 | O'Hare | G06F 21/6227 709/214 |
| 2016/0253710 | A1 * | 9/2016 | Publicover | G06F 16/2358 705/14.66 |
| 2016/0321769 | A1 * | 11/2016 | McCoy | G06Q 30/0185 |
| 2017/0046664 | A1 * | 2/2017 | Haldenby | G06F 21/62 |
| 2017/0316185 | A1 * | 11/2017 | Park | H04L 63/102 |
| 2018/0130158 | A1 * | 5/2018 | Atkinson | G06F 21/00 |

(Continued)

FOREIGN PATENT DOCUMENTS

| | | | | |
|---|---|---|---|---|
| KR | 20100109847 A | * | 10/2010 | G06Q 50/00 |
| WO | WO-2008100264 A2 | * | 8/2008 | H04L 63/12 |

OTHER PUBLICATIONS

Tran, Chau et al., "Are anonymity-seekers just like everybody else? An analysis of contributions to Wikipedia from Tor", arXiv: 1904.04324, Apr. 8, 2019 (v1) (Year: 2019).*

*Primary Examiner* — Neha Patel
*Assistant Examiner* — Clay C Lee
(74) *Attorney, Agent, or Firm* — John L. Sotomayor

(57) ABSTRACT

A system and method for the creation of an atomic internet platform and system is herein presented. Within the atomic internet users, content providers, and event managers may create content or user atoms each of which has a trust history and trust history tail. The atomic internet facilitates direct interaction between atoms of any type and provides curation of information, content, and other data in a trustless environment. Browsing and searching as well as payment and value exchange are facilitated in the atomic internet in a secure fashion based upon an examination of the trust history tail and trust history. The trust history is built over time based upon interactions between atoms and a trust history tail and accumulated trust history transactions are indicative of level of trust based upon the length of the trust history tail and accumulated trust history of transactions.

10 Claims, 6 Drawing Sheets

(56) References Cited

U.S. PATENT DOCUMENTS

| | | | |
|---|---|---|---|
| 2018/0253661 A1* | 9/2018 | Strauss | G06Q 50/01 |
| 2018/0300756 A1* | 10/2018 | Saxena | G06Q 30/0255 |
| 2019/0197443 A1* | 6/2019 | Anderson | H04L 63/06 |
| 2019/0236661 A1* | 8/2019 | Hogg | H04L 63/1433 |
| 2020/0020000 A1* | 1/2020 | Guy | G06Q 30/0282 |
| 2021/0191963 A1* | 6/2021 | Walton | G06F 16/34 |

* cited by examiner

SYSTEM AND METHOD FOR SECURE, TRUSTFUL INTERNET INTERACTIONS

CLAIM TO PRIORITY

This Non-Provisional application claims under 35 U.S.C. § 120, the benefit as a Continuation-In-Part of the non-Provisional application Ser. No. 16/721,233, filed Dec. 19, 2019, Titled "System and Method for Combinatorial Security" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Messaging on the Internet continually evolves to accommodate new services and new systems for connecting users via messaging applications. Communication is a constant need among individual users for sharing information of all types. The messaging services utilizing the Internet, however, are inherently non-secure and require a third party to form a trusted connection from a message content standpoint unless additional actions have been taken to provide some measure of message and data security when communicating over the public Internet.

The entire ad-supported Internet is built around showing ads to people, so that each person can get content at no cost to them. In the early days of the Internet, this "three-legged stool" was balanced, and it worked. The three legs were: the human user, the publisher, and the advertiser. Many humans visited publishers' sites to get content, and advertisers paid the publisher to put their ads on their sites, so the ads could be seen by the human visitors. Fast forward to the popularization of the theory that more targeting would yield better outcomes. This led to what is now known as "surveillance marketing" where virtually every interaction that a human user has on a website, on a mobile app, or any other devices are tracked by many companies. These adtech companies collect and sell the data just like the mailing list brokers of old. Adtech is the "fourth leg" that was forcibly inserted into the three-legged stool, which was previously balanced, but is no longer. This is because the 4th leg is extracting as much value for itself as possible, at the expense of all 3 others.

Adtech companies currently rely upon digital certificates to establish trust and verify legitimate users and interactions. However, certificates can be compromised, even SSL certificates can be compromised when a group of bad actors go through the process to become a certificate authority. Then the bad actors may sit in the middle as a trusted third-party issuing certificate over which they have complete control. In this fashion the bad actors can become the "man-in-the-middle". To attack a Domain Name System (DNS) system lookup, bad actors are using denial of service attacks against the largest DNS providers. Because of this danger of compromised certificates, the certifications don't really protect against denial-of-service type attacks or against intrusion.

However, the one basis that neither a messaging application nor the bad actors can change is the fact that they each take advantage of the public Internet. Current security measures for messaging also use commonly available solutions for encryption, message construction, and message transmission. Thus, vulnerabilities may be discovered by bad actors doing their homework and experimenting with the same protocols and methods used by the messaging application platforms when exercising the protocols and methods over time.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
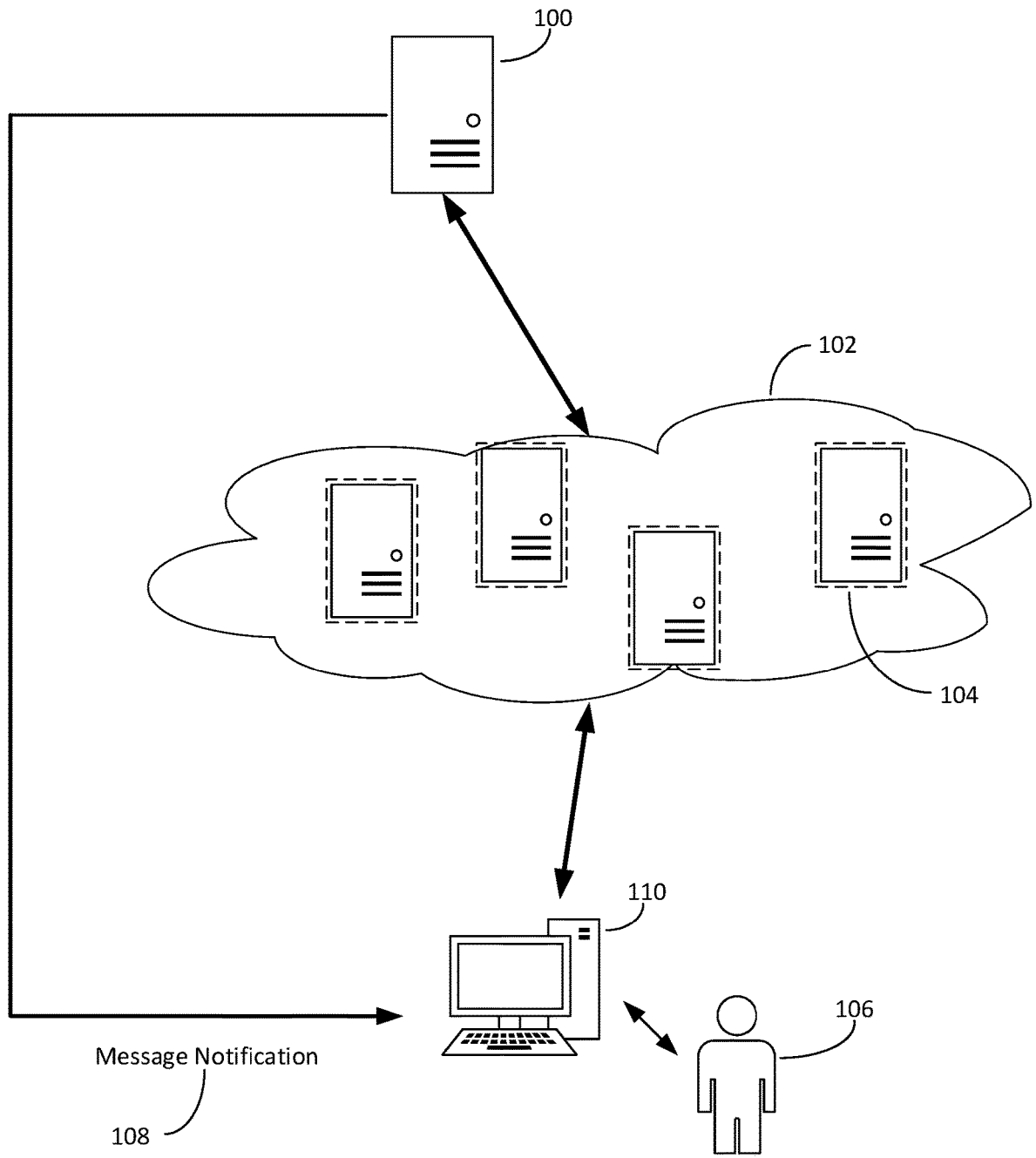
FIG. 1 is a view of an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "content atom" refers to an element of content of text, video, visual representation, audiovisual, or any other type of electronic content having a trust tail associated with the element of content and having an author of the content.

Reference throughout this document to "user atom" refers to a user experience record having a trust tail associated with the user and a history of user interactions with content atoms.

Reference throughout this document to "trust tail" refers to a trust history based upon the number of interactions with the atom to which the trust tail is attached and the credibility of each interaction with the atom. Trust history may be strengthened by adding credible interactions to the trust tail and may be weakened and/or destroyed by lack of interactions or the addition of non-credible interactions. The trust tail thus contains the number of interactions, the history of interactions, and the credibility of interactions with the atom to which the trust tail is attached.

Reference throughout this document to "credible interaction" refers to the interaction of an atom with a provider of content or a user that has acquired trustworthiness, has no negative connotations, and/or has a history of creating quality and trustworthy content or completing transactions in a safe and satisfactory manner.

Reference throughout this document to "IP" refers to the Internet Protocol, the standard data transmission protocol used by the public internet.

Reference throughout this document to "combinatorial encryption" refers to the system and method of creating and transmitting secure message traffic utilizing the steps described in this document.

Reference throughout this document to "shard" refers to the sections into which a message is broken such that the reconstruction of the message and its data content requires the reassembly of all shards associated with that message.

Reference throughout this document to a "haystack" refers to an IP addressable server into which the system server of the innovation may allocate one or more subdirectories into which a shard may be stored. The IP addressable servers may exist in the cloud and are connected to the system server of the innovation through networked communication.

Reference throughout this document to "message notification" refers to a notification communication that is transmitted from the system server of the innovation and contains encrypted information permitting the recipient of the notification to retrieve and access a message.

Reference throughout this document to an "encryption algorithm" refers to any of a set of custom generated algorithms, which will be formulated as two-way mathematical algorithms, from which the system server may select the algorithm to be used to encrypt shards and/or message notifications.

A need exists for devising and implementing a security protocol for messaging that utilizes the Internet Protocol (IP) as a base transmission pipe, while making the message traffic traveling through the pipe too expensive in terms of computation time for bad actors to compromise. The novel innovation herein described is hereinafter referred to as the atomic internet, or the fifth internet, and assumes that encryption alone doesn't work to keep out bad actors and secure the communication of messages between two parties. Encryption of content of whatever type doesn't work if the content is captured prior to encryption and corrupted prior to encryption which can happen if the certificate used as a trust certification has been issued and is controlled by a bad actor as the trusted third-party.

In the atomic internet, or alternatively the fifth internet, every content atom is associated with one or more user atoms. The content contained within a content atom must be created by some creator such as directly by a user, or by a one or more software or hardware system at the direction of one or more users. Content created by an Artificial Intelligence (AI) or Machine Learning (ML) algorithm will be associated with a user or with a company user who is authorized to act on behalf of the company. In this manner the content of each content atom will eventually accrue trusted interactions and greater confidence in the content and ascribe the trusted interactions to one or more user atoms. Where the content is a construction of a company, AI, or ML originator, the trusted interactions will accrue to the company, AI, or ML user atoms as creators of the contents.

In an embodiment, the atomic internet as a system establishes and develops a trust chain that is associated with and may be attached to content and user atoms. The system would know if the trust chain has been tampered with because the trust history will be corrupted. The system may add a trust interaction to the tail of a trust chain, then rehash the entire tail. In this manner a user or other actor attempting to modify the trust chain will be unable to modify any element of the trust chain without modifying the entirety of the trust chain, which is not possible in the atomic internet due to the fact that trust chains are built upon the hash of added transactions and directory lookups for the retrieval of elements of the content and/or transactions. Computation for a hash or other algorithmic calculation is very fast but a directory lookup requires time, thus the security of the system must be tied to directory lookup as well as the recursive hash of the entirety of the trust tail.

In an embodiment, in the atomic internet every content and user atom will have an associated trust tail containing the trust history. The trust history, and the trust tail, grows over time.

In a non-limiting example of the generation of a content trust history in a content atom being associated with a user atom, if an oncologist authors content in the form of an article about cancer treatment, the content atom would be associated with the user atom that represents the oncologist. Likewise, in another non-limiting example, if a sportscaster drafts an article about the latest sports event, the article would be published as a content atom and that content atom would be associated with the user atom that represents the sportscaster. As content atoms associated with various users are accessed, these interactions created the trust tail as the trust history is built from the access and interactions with content atoms. The interaction with the content is recorded as both part of the history of interactions with the content atom in a history tail connected to the content atom and the history tail that is connected to the user atom.

Additionally, the user may provide a rating as some indication of approval or non-approval of the content accessed from the content atom. The form of approval or non-approval may take any form, such as a like indication, thumbs-up or thumbs-down, or other approval indicators, that indicates that the user finds the content credible and possibly valuable. These approval indicators, along with the access indication, form a portion of a trust tail for each content atom as well as part of the history tail. As other user or content atoms connect with and attempt to access the content atom, the user or content atom may seek to determine from the trust tail and history tail associated with the content atom some measure of credibility for the content contained within the content atom. In the non-limiting examples above, an article about cancer treatment generated by an oncologist may have better credibility than content drafted by a science writer, and would certainly have much more credibility than an opinion article on cancer treatment drafted by a plumber. Over time as additional interactions with the content article from the content atom are accessed and ratings are provided by various users, the credibility of the content atom increases or decreases and confidence in that content atom may increase or decrease based upon the trust and history tails connected to the content atom. In this manner, the content atom may grow in reputation and value, or may be relegated to a poor reputation and little value, or dismissed entirely based upon the history of interactions and ratings collected.

It is very difficult to fake the buildup of a trust history over time. In the atomic internet a two-tier security verification is used to commit transactions to the trust tail. The two-tier verification reviews the length of a trust tail and a review of the trust chain that is embedded within the trust tail. In a non-limiting example, the trust tail associated with any content and user atom may be reviewed at one of two levels. If a transaction requires a quick resolution, the trust verification process of the atomic internet may simply review the length of the trust tail to determine at a high level the relative trustworthiness of the user or content atom surveyed. The longer the trust tail, the more trustworthy the atom surveyed, with trust levels pre-established by the user or system requesting the transaction. If greater trustworthiness is the goal, a user may give permission to review the contents of the user atom trust tail, or an owner or corporate entity may give permission to review the contents of a content or event trust tail. If permission is given, the trust verification process may open the trust tail and review the trust history contained within the trust tail of the atom being surveyed to determine if there have been any attempts to access, edit, or otherwise corrupt the trust tail. If the trust tail has been tampered with in any way, or if the trust tail is empty or has very few elements in the trust chain, the system may return a result to the system or individuals involved in the transaction reporting little or no trust in the trust tail. At each level the trust tail provides some assurance that the atom surveyed may or may not be trusted, thus informing the user or system involved in a transaction to be cautious of dealing with that particular user or content atom.

Each user atom is tied to a particular human in practice. Trust history accumulation builds in this trustworthy behavior for a particular user atom. The longer the accumulated trust history associated with a user atom the more trustworthy the user atom may be considered. This incentivizes trustworthy behavior and repairs the lack of curation.

Once again, each content atom is associated with a person or with a corporate entity such as a publisher or other content creator. Each content atom may be created through interaction with a user interface such as, in a non-limiting example, a browser-like interface and placed on the internet through a publication action. The publication of a content atom will include the creation of a trust tail that is associated with the content atom. When a content atom is created, the content atom may be sharded, or broken into an unknown number of individual pieces utilizing a combinatorial security method. The content atom now persists in a plurality of electronic storage sites or in cloud storage. The content atom may be used in a transaction immediately, or may be retrieved and used in later transaction instances.

Security can be enhanced by incorporating time as an element to be overcome in intercepting and grabbing the content in messages from a sending party to a receiving party. Time is the only immutable commodity. Adding things that just take time to do, such as traversing a directory structure to get to content can extend the time necessary for an attacker to intercept and retrieve messages. Attackers would have to brute force the directory traverse and decryption of the alphanumeric strings contained in the directions for retrieving the shards that comprise stored content.

The atomic internet system also utilizes combinatorial security to secure the transmission and retrieval of communications sent from one atom to another. Utilizing combinatorial security, the system may send a message from device to device directly with no requirement for a third-party to establish trust between the two devices. In a non-limiting example, a content creator may create a content atom and post the created content atom to a publisher.

The combinatorial security platform does not rely on the transmission of message content directly from a sender to a receiver. This novel system and method for the secure transmission of message content from a sender to a receiver uses a proprietary messaging platform and novel encryption process. The messaging platform and novel encryption process together provide the basis for combinatorial security for message content. The platform and process create a situation where there are so many possible combinations for transporting, encrypting, storing, retrieving and decrypting any secure message content that an attacker will run out of time to solve all parts of retrieving, decrypting, and reconstructing any captured message content before the message is picked up by an intended recipient. In a non-limiting implementation, when the message is picked up by the intended recipient all portions of the message content are permanently removed from any publicly available network sites and the content resides solely with the recipient.

Assuming attackers can bring extreme amounts of computer power to the issue of breaking the message encryption this system creates an ever-expanding set of message segments, storage positions, unique encryption algorithms, and retrieval requirements to expand the time required to collect, decrypt, and reconstruct any message to the point where this process is greater than the computer power available to perform the message processing. The system also places time gates into the process. In a non-limiting example, sub-directory lookup takes a determinate amount of time and can't be shortcut; the sub-directories wherein message segments are stored must be identified and accessed, requiring a finite, measurable amount of time. Adding in this time element changes whether an attacker can complete all of the steps before message is picked up. Additionally, simply breaking one message segment or message does not provide the ability to break other messages, because each message is treated as a new message with no connection to any other message. In this non-limiting example, the message exists for a pre-set amount of time after the message notification is transmitting to a user for them to retrieve. If the pre-set amount of time is exceeded with no retrieval of the message, the connections to the storage locations and all message segments are deleted and the message is no longer retrievable.

In an embodiment, the concept of combinatorial security is enabled by the system being capable of creating an unlimited number of unique encryption algorithms, which makes it very difficult to know which of the created unique encryption algorithms is being used to encrypt any message or message segment. If greater message security is needed, the system may create more time use through the creation of more encryption algorithms, more sub-directories to traverse, and more data servers in which to store and hide message segments, also known as shards.

As an initial step, the combinatorial security system receives content that a sender wishes to include in a communication, or message, to a recipient. The message content may be any type of content, including text, video, audio, multimedia, data files, data directories, or any other type of content that a sender wishes to transmit over networked communication channels. The system server initiates a pre-processing action in which the received content is treated as an object having a wholly alphanumeric representation of the content. This alphanumeric object may then be broken into an unknown number of shards, wherein each shard may be of a non-constant length such that the shards may not be of uniform size. In a non-limiting alternative implementation, shards may also be created of uniform size. After the content is broken into the unknown number of shards each of the shards is then encrypted with a selected, custom encryption algorithm. These encryption algorithms are not hash algorithms or ciphers, but are two-way mathematical constructs for use in encrypting each shard. The system may construct an unlimited number of mathematical transforms for use as encryption algorithms. The system may determine the number of encryption algorithms to create on a dynamic basis, as needed, even if the number of encryption algorithms to be created is much larger than the number of shards to be encrypted. There is no need for the system to create or maintain a table or database containing previously created encryption algorithms. However, the system may create and store encryption algorithms for later retrieval and use, or may create an unlimited number of encryption algorithms dynamically as needed. Regardless of the method of encryption algorithm creation, the system selects and uses a different encryption algorithm in the encryption of each created shard.

Subsequent to the creation of the unknown number of shards and the selection of an encryption algorithm for each shard, each shard may then be stored into one of an unknown number of servers. Each selected server may be any server having an IP address, regardless of operating system. Each server is uniquely addressed in the cloud by the IP address associated with that server. The system may navigate to each server in the cloud utilizing the IP address associated with that server and open a communication channel with that server. The system may then create any number of sub-directories, from one to any number that may be chosen to enhance obfuscation. The sub-directories are simply alphanumeric sub-directories of any alphanumeric length for the identifier of the sub-directory. This identifier may be of any length up to the naming limit for sub-directories within the selected server.

The system may then store one or more shards within selected sub-directories, chosen from the list of created sub-directories, and close the communication channel with the server. The system retains the IP address of the server and the created sub-directory in association with the shard, or shards, stored within the created and selected sub-directory(s). In this configuration, the server is referred to as a "haystack" because the system may create an unlimited and unknown number of sub-directories within the server in which to store the shard. The shards are thus distributed among a large and unknown number of servers. Within the servers the shards are distributed among a large and unknown number of sub-directories within each server, thus placing the shards within an unknown number of "haystacks".

At this point all shards containing the encrypted alphanumeric content have been distributed among an unknown number of "haystacks". The server may then construct a notification message that contains all of the information needed for the user to decode and understand how to retrieve the message for later reconstruction and decryption. The server may then transmit this message as a "right to view" invitation to the intended recipient.

Unlike email servers where a message travels from one sending server to one receiving server, in this system no portion of the message content committed to the system by the sender is actually sent from the sender to the recipient. The encrypted shards that contain the original message content remain in the cloud. Inventor calls this a "right to view" as opposed to the message being sent from point A to point B, from sender to recipient. At any point in time, prior to the message being picked up by the intended recipient, the sender can rescind, or un-send, the message. This permits erasure of the message and all shards prior to receipt should the sender wish to cancel the message. This is because the message is never "sent", simply distributed as shards into the cloud until the recipient picks up the message.

The system may then transmit a notification to the recipient that they have a message to be retrieved. Once again, the notification is sent to the recipient as a "right to view". The recipient may open the notification, delete, or ignore the notification. If the recipient deletes or ignores the notification, the system server will wait a pre-established period of time to provide the recipient with the opportunity to change their mind and accept the notification. At the end of the pre-configured period of time, the system server will remove all shards and all association with the original content effectively erasing the message before any party other than the recipient can successfully retrieve the message shards and reconstruct the message.

The notifications themselves can be stored in any haystack. To defeat the security on the message content an attacker would have to be sure they got the right notification, did they get the right shards, did they get all of the shards and in the right order, and does the attacker have the right encryption algorithm. In many interception cases and attacker attempts to determine if they have ended up with message content that conforms to a human language. The attacker knows that if they end up with words in a human language, such as, in a non-limiting example, English, the attacker is done with decryption, if the attacker ends up with an alphanumeric string they still won't know when if they are done with the decryption. Thus, the attacker cannot tell the decryption algorithm when to stop processing if they don't know they are done.

If the recipient accepts the notification, the notification may contain bits and clues that the recipient may use to retrieve the message intended for them. The recipient has a public key associated with a private key. The system encrypts the notification message with the public key of the intended recipient, where this public key is provided by the sender of the original content. The recipient is the only one with the private key to open and decode the message sent from the sender. The system will rotate public/private key pairs with every message. Thus, the public/private key pair is different for every single message. There is a root in time—but public/private key is salted with time. The system waits for a time cycle to generate a new encryption key pair. In effect, every message has a new public/private key pair.

This is how the system protects the notification. Each notification is different for each message, but the notification contains enough information for the user to go and retrieve that message. Even if the attacker can determine when the decryption of the message shards is successfully completed, the attacker must obtain the private key of the recipient for the message content itself. However, there is never any transmission of a message that might contain a recipient's private key for a "man-in-the-middle" to intercept. This process negates such "man-in-the-middle" attacks because there is never any message sent, synchronously with the notification, that might contain a recipient's private key.

The reading process provides the recipient with a "right to view" which permits them to gather the shards from the "haystacks" and sub-directories and reverse the mathematical calculations to then reassemble and decode the original message. The notification to the recipient is decoded via the recipient's private key when the recipient clicks "view" the notification. The decoded notification then provides the instructions and information to enable the recipient to retrieve and reconstruct the message. The instructions and information provide the recipient with the ability to retrieve the shards from the cloud (haystacks).

All of the shards are gathered into the computer being used by the recipient. Upon successful retrieval of all shards associated with the message content, the intended message recipient may then reassemble the shards in the correct order using the information and instructions contained in the message notification transmitted from the system to the message recipient. Upon successful reassembly of the message shards, the message recipient may decrypt each of the shards utilizing the encryption algorithm specific to each shard. The encryption algorithm for each shard may be transmitted to the message recipient within the message notification.

Upon reassembly and reconstruction of the shards, the recipient will also have to decrypt the alphanumeric string that results from the shard decryption. The system may provide the recipient with the appropriate key and/or encryption algorithm to perform the decryption of the alphanumeric string into the original content, after which the recipient may view the message content using a browser on their computer. In the process of gathering the shards from each of the haystacks, the shards are deleted from each subdirectory and server upon retrieval. At the completion of the shard collection all message content has been deleted from the servers and no part of the message remains to be retrieved by a party that is not the recipient.

Entropy in randomness and language has lower entropy than alphanumeric strings, because there is more order to language than alphanumeric strings. Thus, transmuting a message composed in a language into simple alphanumeric strings increases entropy in message content, increasing the security of such messages. Attackers may look for areas of low entropy for further study in attempts to defeat the encryption into which message content has been secured. The message content before decrypting with a recipient's single use final private key will be in alphanumeric string form. Even if an attacker were able to break the encryption on the message content, the attacker can't tell anything about the message from the alphanumeric string as opposed to language and cannot resurrect the message content just from the alphanumeric string that represents the message content.

Users associated with created content may be provided with the ability to profit from their created content through a compensation capability associated with each content atom. The basis of the compensation capability is the ability for the system to process and manage micro-payments for access to content contained within a content atom. Micro-payments may take the form of fractions of a cent to access the content contained within a content atom. In a non-limiting example, when a user atom accesses the content within a content atom and begins to consume the content the system may automatically process a very quick automatic donation of a fraction of a cent. This automatic donation of a fraction of a cent will be for content contained within content atoms that have short, or no, trust or history tail connected to the content atom.

As the trust tail connected to each content atom grows with positive ratings by users interacting with the content atom over time, the content contained within the content atom becomes correspondingly more valuable. As the trust tail grows and as the trust history records more positive ratings, the compensation required to access the content increases as managed by the system. In a non-limiting example, if an oncology article is authored by an oncology specialist it will have a particular compensation, a predefined fraction of a cent or other monetary value, associated with that content upon publication. This particular compensation may be monitored by the system and the compensation amount increased as a function of the increase in trust as evaluated by an analysis of the length of the trust tail and the contents of the trust history. In this system, as the content atom trust history grows both in length of time the content atom has been in existence and an increase in the number of positive comments and approval ratings the content atom will grow in value and the compensation earned by the user that created the content will grow in as a result.

In an embodiment, the compensation capability is an inherent element of the system and does not require a value decision by a user. If the user chooses to access the content, the system will provide a user with the compensation required for access to the content and ask for the user's approval for the payment. The system may then exact payment automatically upon the approval of the user to the compensation required to receive the desired content.

Each content and user atom also has a permission model and a search model associated with the atom. In a non-limiting example, a content atom may be published in a free mode, where permission is given to anyone who wishes to download and consume the content of, or interact with, the content atom. A content atom may also be published with a set of permissions that must be met, such as consideration in the form of the payment of a particular fee or other valuable considerations that may be specified by the owner of the content atom, before the user is able to access the content or interact with the content contained in the content atom. Upon satisfaction of the consideration a user may be provided with the location, encryption algorithm, recombination instructions, and password to retrieve, reassemble, decrypt and consume the content or interact with the event contained within the particular atom.

User atoms may also have a permissions model where the permissions are given by a user to access personal information or other data contained in content atoms that are owned by the user. A user atom may have instructions to permit outside user atoms to download information that the user atom owner wishes to provide freely, and may have different instructions for information that the user atom owner only wishes to share with a very restricted set of outside users. In a non-limiting example, the owner of a particular user atom may wish to keep all of the owner's health record information completely secure such that only the owner and the owner's physician may download the health record information from the content atom in which the user has placed the information. Because the content atom controlled by the user atom is completely secure from hacking no one who does not have the proper permission from the user atom owner may access the user's information.

Additionally, content contained within content atoms when published and secured utilizing combinatorial security are not attackable because a hacker or bad actor cannot locate all of the shards that have been distributed. For this reason, content atoms cannot be taken down due to the redundancy created when content atom shards are distributed to multiple locations. A user also benefits not only from the benefit of deterring censorship but also by permitting multiple users to retrieve the content who have provided payment or other consideration for the access permission to the content owned by the user.

In an embodiment, as previously indicated a trust tail is associated with each content and user atom. The trust tail contains the trust history for the atom with which it is associated. A user atom may accumulate a trust history in the trust tail that consists of a record of each interaction with which the user is involved over time. If a user has accumulated a large number of trusted interactions, where a trusted interaction is where a user has completed a number of transactions in a trustworthy manner by following the conditions of the transaction and successfully performing the actions and considerations of the transaction (where consideration may take the form of a payment or represent approval ratings from other users), these transactions are recorded in the trust history and remain attached to the user atom in the trust tail. If a user has not performed one or more transactions in a trustworthy or satisfactory manner by non-performance, non-payment, negative approval ratings, or other violations of the transaction, the system may act to truncate the trust history such that the trustworthiness of the user associated with the user atom is deemed to be less trustworthy, or perhaps not trustworthy at all. Users are thus incentivized to perform in a trustworthy manner to build and maintain the trust history so as to be evaluated as trustworthy in future transactions and interactions with other users.

The trust tail provides a two-tier methodology for evaluating trust associated with a user and/or content atom. At a first-tier, a simple evaluation of the length of the tail of the trust history, which has been accumulated over time, may provide a quick evaluation mechanism for others to judge the trustworthiness of a content or user atom by looking at the length of the trust history tail. A second-tier evaluation may consist of actually looking at the transactions within the trust history to review ratings, comments, completed transactions, and other interactions stored within the trust history. When evaluated for a future transaction with another user the longer the accumulated trust history associated with a user atom the more trustworthy a user atom may be considered and the more easily transactions and interactions may be completed. In the atomic internet each content and user atom has direct addressability and the trust history contained in the trust tail associated with each atom provides the ability to trust interactions and transactions with users who do not now, and perhaps never will, know one another.

In the atomic internet, a content atom may disallow access to content to any user atom that has zero trust history. A zero-length trust tail, meaning no trust transactions have yet occurred or been recorded against the user atom, may indicate that the user content is not associated with a real person. In a non-limiting example, a bot that is created for the purposes of simply accessing and taking content will not have a trust history as it has not interacted with other user atoms or consummated any transactions on behalf of the user. The atomic internet system server may instruct legitimate content atoms to not respond to requests from any user atom that has a trust history having zero transactions or interactions. In this manner, the system may eliminate the issue of bots scraping legitimate content for other uses such as plagiarizing the content and avoiding compensating the originator of the content.

In an embodiment, locating a particular content atom or user atom is facilitated by the association of word clouds that are relevant to the atom to be searched. An atom may have a number of words that are both keywords for the subject of the particular and weighted for amount of relevance of that keyword to the associated atom. This facilitates the search function to assist a user in locating a particular atom. In a non-limiting example, where a content atom is a product page, the content atom containing the product page will have a word cloud around it for use in both browsing and searching actions. Browsing is a less stringent search criteria and may permit the location of terms within a word cloud that have both low and high similarity scores with respect to the content of the atom to which the words are associated. Thus, when a user is browsing many more content atoms will be located as relevant for the user.

In an embodiment, the atomic system has the concept of gravity, where gravity is defined as the words and terms that are associated with the content of a particular content atom. The gravity of a particular content atom is created simply by using similarity algorithms to relate particular words and terms to a content atom. In a non-limiting example, if this user atom has heavily weighted oncology words in the word cloud around it and the content atom has heavily weighted oncology words around it because it's a piece of content about oncology then gravity or similarity algorithm will pull those two atoms together based upon the gravity or similarity attraction between the two content atoms. This process may create the mechanism for discovery to the user atom.

Even without searching a user atom can start to discover these oncology articles that are new to them through the discovery of words and terms that are linked by gravity to a particular content atom. The mode of search, termed browsing, can be satisfied by the word cloud and similarity algorithm mechanism. Also, when the person as represented by a user atom doesn't necessarily know what they're searching for but they're kind of interested in browsing things around a particular topic area the atomic internet may bring those content atoms closer to the user atom using the console gravity.

When a user initiates a search for a particular term, the system will search for word clouds in which the weighting of a keyword is very high with respect to the word that is being searched. Keyword weightings may be created utilizing existing standard software algorithms and the atomic internet may use those weightings to locate content and user atoms that have the greatest similarity, according to the assigned weighting, to the term or terms that are the object of the search. This process permits rank ordering of searched terms that are the object of the search as well. This process assures that the search activity is a much more surgical operation than a browse activity and addresses the location of specific atoms having the greatest similarity for the user as opposed to the general location activity of a browse action.

In an embodiment, a content atom created in the atomic internet may represent a product or service in the physical world. In a non-limiting example, pairs of athletic shoes in the physical world may be represented by one or more content atoms. In this example, a pair of athletic shoes being offered on an Amazon web page may have a product image, video, descriptive text and other product information. The web page may also have user reviews, product reviews, and other marketing and sales material associated with the physical product. All of this information will be included in the content atom that represents the athletic shoes in the atomic internet. In addition, a word and term cloud will be associated with the content atom to provide the content atom with access to user search through the gravity action of the atomic internet as previously described. This same content atom information, association, and search capability is provided for each content atom in the atomic internet regardless if the content atom represents a product in the physical world, a published article, a multimedia presentation, service reservation, ticket access to a particular venue, or any other content or service in the physical world that is available for access or purchase by a user.

In an embodiment, each atom, regardless of type, may have a permission model that provides for security of access to the contents of the atom. The permission model may have different levels of permission that may be granted by the owner or administrator of the atom. The least secure permission level may permit access to the contents of an atom to everyone who requests access to the atom contents. In a non-limiting example, this level of access may be thought of as free access. In the case of a content atom the atom may be a published document that the creator wishes to be accessed by anyone and freely distributed. The free access permission permits any atom that interacts with this content atom to freely access the published content and copy, download, resend, or otherwise consume the content with no restrictions. A permission level that is more secure may require payment to the owner of the content atom to secure access to the content published in the content atom, or, in the case of an interaction with content contained in the content atom, a user atom would have to provide evidence of the purchase of access to the content to be given permission to interact with the contents of the content atom. A very secure permission level might be associated with the personal or medical data of a user contained within and owned by a particular user. At this level of permission, the user would have to specifically grant permission to any user or content atom that sought to access the privileged content associated with the user atom. This level of permission would tightly restrict access to the user atom to only the user him/herself and any other atom, such as a personal physician user atom or a life insurance company user atom, to which the user specifically grants that level of access permission.

The permission model takes advantage of combinatorial security to establish and maintain the security of access to a content or user atom. Each atom is securely stored through the combinatorial security process and a security access identifier is generated and provided to the user/owner of the atom. This security access identifier contains the instructions for reassembling an atom along with the appropriate hash algorithm utilized in the recursive hash of the trust tail. If granted permission, an atom may utilize the hash algorithm to computationally recreate the hash of the trust tail. This computed hash may be compared with the hash stored within the trust tail to verify that the trust tail has not been tampered with or modified in any way, such that the atom seeking the contents of the retrieved atom may verify that the contents may be trusted to be those contents that were validly stored within the content atom and verified by the trust tail. The atom seeking the contents may then use the security access identifier to access the permitted level of content from the retrieved atom.

In an embodiment, at the most basic level all atoms, regardless of type, are associated with a human owner. User atoms are owned by the user, content atoms are owned by the user that created the content or in the case of content atoms containing content created and published by a company owned by the company with rights to access the content provided by an authorized employee of the company such as a company office with the authorization to act on behalf of the company.

In an embodiment, trust tails contain the history of interaction between an atom, regardless of type, and all other atoms. Each interaction provides an additional link in the trust history accumulation for each atom. Various interactions with a content atom may serve as interactions that assist in building the trust worthiness of the trust tail associated with a content atom. In a non-limiting example, once a content atom is published user and other content atoms may locate the content atom either through a browse or detailed search for one or more of the keywords that are placed in the word cloud that is associated with the content atom. As user and content atoms discover the published content atom the user or content atom may access the content freely for content that is open and free of charge or by supplying a micro-payment for paid content. The fact that a user or content atom has accessed free content or supplied payment to access the content of a published paid content atom is recorded as a trusted interaction associated with the published content atom and is memorialized within the trust tail. These access and payment transactions may serve to increase the trustworthiness of the content atom by lengthening the trust tail. In another non-limiting embodiment, if a user after having accessed the content within a content atom decides that the content accessed is interesting or has other value the user may wish to share the content atom with other users. Each time a user shares the content atom with another user the action of sharing is recorded to the history of interactions within the trust tail associated with the content atom being shared. Through content access, micropayment, and sharing interactions both the length of a trust tail and the quality of interactions recorded within the trust tail increase the trustworthiness of the content atom.

In an embodiment, atoms may interact with one another. When a user atom interacts with a content atom it generates value both in terms of lengthening the trust chain attached to the content atom and in the process of generating payment to access the content contained within the content atom. Additionally, appending an access transaction to the trust chain attached to the content atom increases the trust history associated with the content atom. When a user atom interacts with another user atom the interaction will be added to the trust chain attached to both user atoms if the interaction is not negative. Upon a positive interaction the instance of the interaction may be added to the trust history attached to each user atom and the trust history may be updated to include the actual interaction between the two user atoms. In this manner both user atoms that are party to the interaction will receive the benefit of the addition to the trust history and lengthening of the trust chain attached to each user content atom. These user-to-user interactions, once again as long as they are not indicated as negative, work to build the trust history over time such that user atoms may build trust history independent of any third-party certification. These interactions may serve to increase the trustworthiness of a user atom over time.

In an embodiment, for each atom, whether user or content, longer trust tails indicate a longer time over which a trust tail has encountered interactions with other atoms and built a trust chain and trust history. A longer trust tail is thus indicative of greater trustworthiness and accrues greater value to the atom, regardless of type. Value associated with an atom is, by its nature, variable. The variable value of the atom may be tied to the credibility of the atom being accessed based upon the length of the trust chain or trust tail and the content of the transactions stored within the trust chain or trust tail. A longer trust chain and positive interactions between atoms may generate greater value due to the credibility built over time through the interactions between atoms. In a non-limiting example, a longer trust chain or trust tail for a content atom may result in greater value associated with the content published with the content atom. In another non-limiting example, a longer trust chain and/or a greater number of positive interactions recoded within the trust history contained in the trust chain for a user atom may result in a deeper trust for any content with which the user atom may be associated.

In an embodiment, the verification that the user content is associated with a real user, and not just some ephemeral computer construct, may be enhanced by verifying device sensor traces for the device associated with a user that is in contact with the atomic internet. This verification may take the form of monitoring a device sensor, such as, in a non-limiting example, a GPS tracker or other sensor installed in the device, to provide device sensor traces that indicate physical location of the device. When the record of device sensor traces is analyzed if the device moves to another physical location in a time period that is much shorter than would be allowed by the laws of physics, such that it could be said to be practically instantaneous for example, this result could indicate that the device has been compromised in some fashion and is either now associated with a computer construct, has been coopted by an artificial process, or has been corrupted in some other fashion. When the analysis of the device sensor traces provides such a result, the atomic internet servers could be alerted to such an abnormality in the trace data. The server may then take steps to verify the identity of the user associated with the device, request a human verify their use of the device through something like two-factor authentication, or may shut down access to the atomic internet by the device until the human user associated with the device verifies that they are still in possession of the device.

Additionally, if the user profile on a device were to be cloned into a second device, and that second device suddenly appears to be a data center or is suddenly seemingly teleported to some other IP address from the IP address that is initially associated with the user's device, the atomic internet server protocol may be to shut down that user profile and device until an investigation is performed. If the investigation determines that the user is no longer in control of the device, or the profile initially associated with the device, the atomic internet server may delete the interface application on the device that has been used to connect to the atomic internet servers. In this fashion, the atomic internet provides an additional layer of security against intrusion and mis-use by bad actors.

In a non-limiting example, the security layers built into the atomic internet guard against the fake news issue because the system is able to judge the trustworthiness of any content atom which happens to be news based on the user atom that created the content. If the content is created by a real journalist a user can look at the user atoms trust history that is associated with the content atom to say, okay, well this journalist has been trustworthy for a long time. So, because the content was created by a trustworthy journalist the user wishing to purchase and consume the content in the contact atom is able to judge the trustworthiness of the content.

In an embodiment, the atomic internet, or fifth internet, may be an entirely disintermediated environment in which user and content atoms may not require trusted third-parties to intercede in inter-atom transactions. Additionally, atoms of any type may interact directly with other atoms directly without requiring a third-party to facilitate transactions where exchanges of value, whether in the form of monetary payment, exchange of valued content, bartering of dissimilar content, or any other form of value exchange, may proceed in the confidence of the credibility established over time and encapsulated in the trust chain and trust history of each atom. The atomic internet then may enable trust-based curation of content and value from atom to atom.

The enablement of trust-based curation by the atomic internet may also permit users to decide what level of risk with which they may be comfortable. In a non-limiting example, if a user is comfortable with taking risk the user might transfer payment to a content atom with a very short trust chain and limited trust history based upon the level of risk the user is willing to take to receive the content or value. Likewise, a user may seek only the most trusted atoms with which to interact based upon very long trust chains and numerous transactions within the trust history captured in the trust chain. A user may also set triggers and thresholds for the level of trust they are willing to accept in order to acquire access to particular content or value associated with an atom. In this manner, a user may place a very low threshold of trust for content that is more of an entertainment category, place a strong threshold of trust for content that is associated with financial matters, and place a highly restrictive and extreme threshold of trust for sensitive personal data and medical records.

In an embodiment, a content atom may set thresholds for payment, value exchange, or security for the content to be provided to user atoms seeking to access the content contained within the content atom. In a non-limiting example, a content atom could set a threshold of access that would require a user atom to have a certain level of trustworthiness as established by the trust history and trust chain attached to the user atom in order to access the content. In an additional non-limiting example, the content atom could require a user atom to demonstrate not only membership within a trusted group, such as requiring a user atom to be associated with an endocrinologist to access content expressing the latest developments in endocrinology, but also demonstrate the purchase of this content prior to access.

In an embodiment, the atomic internet, or fifth internet, may also be backward compatible with the original iterations of the Internet that are currently in operation. To accomplish this backward compatibility, the fifth internet servers may create content atoms that are pointers to content already available on the Internet. The pointer within the created content atom may be a URL pointer to the existing piece of content, such as an article, web page, multimedia presentation, podcast, text message, video presentation, or any other existing piece of content on the existing Internet. The created atomic internet content atom, however, will also have a word and term cloud around the content atom such that discovery and search processes, as well as gravity for the legacy content, will operate the same for these content atoms pointing to legacy content as for content atoms created and published by the atomic internet. In this fashion the atomic internet can still point to all valuable information contained in the old Internet, but put all mechanisms for protection, verification of identity, search, discovery, and gravity for these legacy items as well. The fifth internet, or atomic internet, is therefore built on the railroad tracks of the old Internet because the fifth internet continues to ride on the rails of the Internet Protocol but is implemented as a software layer on top of it.

In an embodiment, by permitting each atom to set trust thresholds the atomic internet may prevent automatic or artificial constructs such as internet bots or other constructs from accessing a user atom, content, or an event. The atomic internet may achieve this level of curation by looking at trust tails or chains and trust history associated with the atom attempting to access a user or content atom. Synthetic creations such as bots or other constructs may have a short trust chain or trust tail and the trust history may be empty with regard to actual trusted interactions with other user and/or content atoms. In this manner the atomic internet may enable trust-based curation while fostering direct interaction between atoms.

Turning now to FIG. 1, this figure presents a view of an exemplary system configuration consistent with certain embodiments of the present invention. In an exemplary embodiment, the combinatorial security platform is operating on a system server 100. The system server 100 maintains a bi-directional data communications connection with servers operational in the established cloud of networked system servers 102. Through the data communications connection, the system server 100 may connect to one or more servers 104 that are addressable utilizing the Internet Protocol (IP) as an enabling protocol for addressing the one or more servers 104 through the known IP address for each selected server 104. The system server 100 performs the steps of encoding and encrypting message content that a message sender wishes to provide to a message recipient 106. Upon the completing of the sharding and encryption steps, the system server 100 contacts a number of IP addressable servers 104 in the cloud 102, creates an unknown number of sub-directories on each IP addressable server 104, and stores the created shards in the created sub-directories in the selected IP addressable servers 104.

Upon completion of the distribution of the encrypted shards to the selected IP addressable servers 104, the combinatorial security platform transmits a "right to view" notification 108 to the intended recipient of the message content 106. The intended recipient of the message 106 will be provided with the directions, clues, and encryption keys and algorithms that will permit the recipient 106 to download the message shards to any computer 110 associated with the recipient 106. Once downloaded, the computer 110 may apply the received encryption keys and algorithms to reassemble, decrypt, and decode the message content. The message content may then be reviewed by the recipient 106 on any browser active on the recipient's computer system 110.

Figure 2:
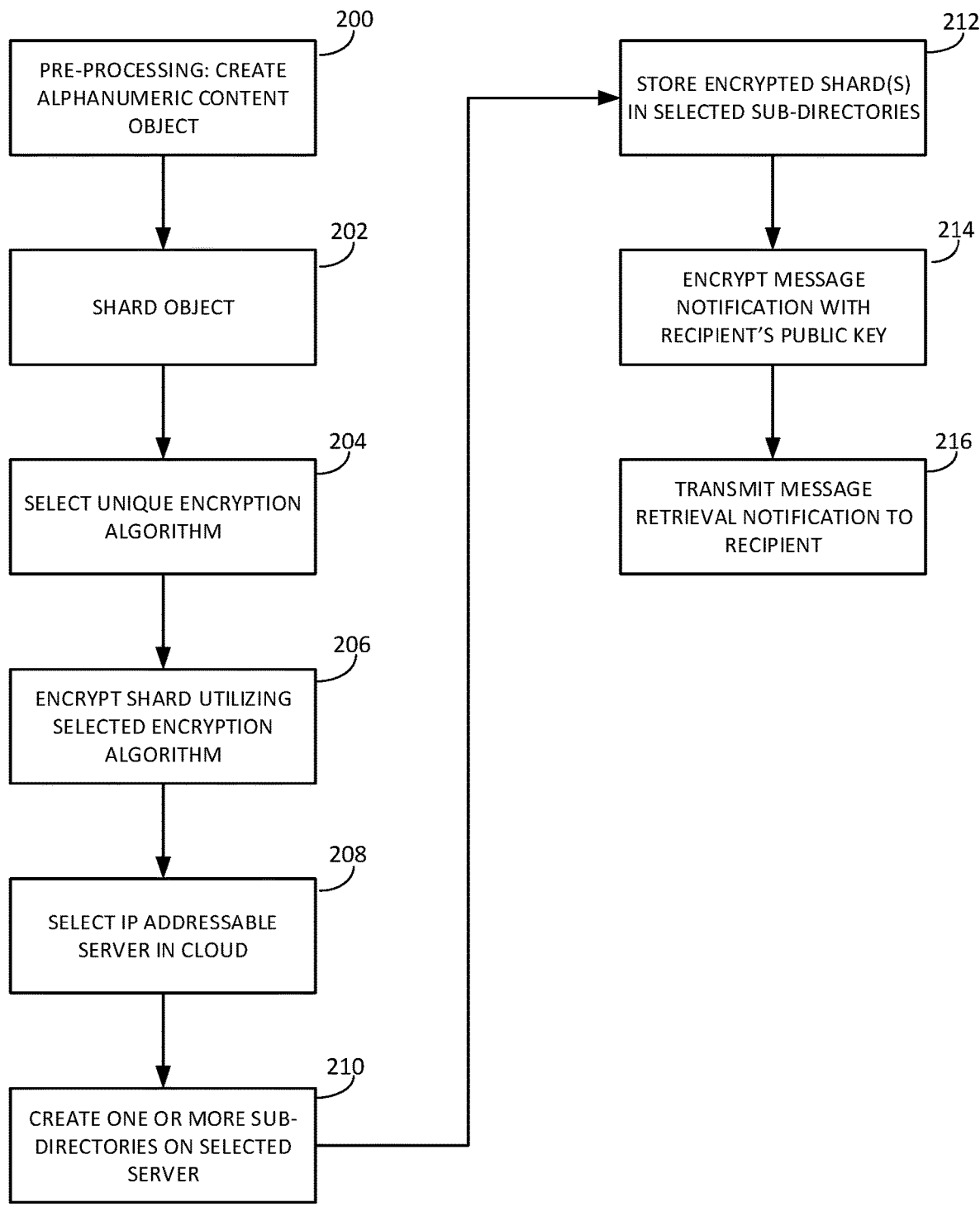
FIG. 2 is a view of the secure encoding of message content process flow consistent with certain embodiments of the present invention.

Turning now to FIG. 2, this figure presents a view of the secure encoding of message content process flow consistent with certain embodiments of the present invention. In an exemplary embodiment, the combinatorial security platform begins with the request from a sender to prepare a message for secure transmission to an intended recipient. At 200, the system receives the message content from the sender and begins by creating an alphanumeric content object from the message content received. At 202, the alphanumeric content object is split up into sub-portions of the whole of the message content. These sub-portions, referred to as "shards", may be of indeterminate length and the system may determine on an ad hoc, dynamic basis as to how many shards should result from the message content. Thus, the number of shards and the length of each individual shard is not determined according to a pre-configured business rule or algorithm, but instead the length and number of shards is different for each message and is calculated dynamically at the time the sharding operation is performed. At 204 the system creates and assigns a unique encryption algorithm for each shard, and the shard is encrypted utilizing a different, unique encryption algorithm for each shard. Each encryption algorithm is generated as a two-way mathematical algorithm that may be selected from a previously generated table of such algorithms, or may be generated dynamically at the time the system requires the encryption algorithm to apply the encryption to the designated shard. Thus, it can be seen that both a very large number of shards and an unlimited number of encryption algorithms may be generated to provide for secure encryption of the shards containing the message content. At 206, each shard is encrypted with the selected encryption algorithm.

At 208, the combinatorial security system server selects the IP address of an IP addressable server within the network cloud. The selection of an IP addressable server provides a destination upon which an indeterminate number of sub-directories will be created to establish that IP addressable server as a "haystack". At 210, the combinatorial security system server creates the dynamically determined number of sub-directories within the file system of the IP addressable server. At 212, the combinatorial security system server selects on an ad hoc basis a subset of the shards created from the message content to be placed within a plurality of the dynamically created sub-directories on the IP addressable server. The combinatorial security system server repeats the steps at 208, 210, and 212 until all shards containing the message content have been stored within determined sub-directories on a number of IP addressable servers. The combinatorial security system server stores and associates with each message all of the shard locations, encryption algorithms, and haystack identifiers for the message content distributed for each message transfer request from senders.

At 214, upon the completion of the distribution of all message shards, the combinatorial security system server creates a "right to view" message notification. The message notification may contain all of the information and encryption modalities that are required for the intended recipient of the message to retrieve and view the message content. The server then encrypts the message notification with the public key of a public/private encryption key pair of the message recipient specified by the sender. At 216, the combinatorial security system server transmits over a network communication channel the "right to view" message notification.

Figure 3:
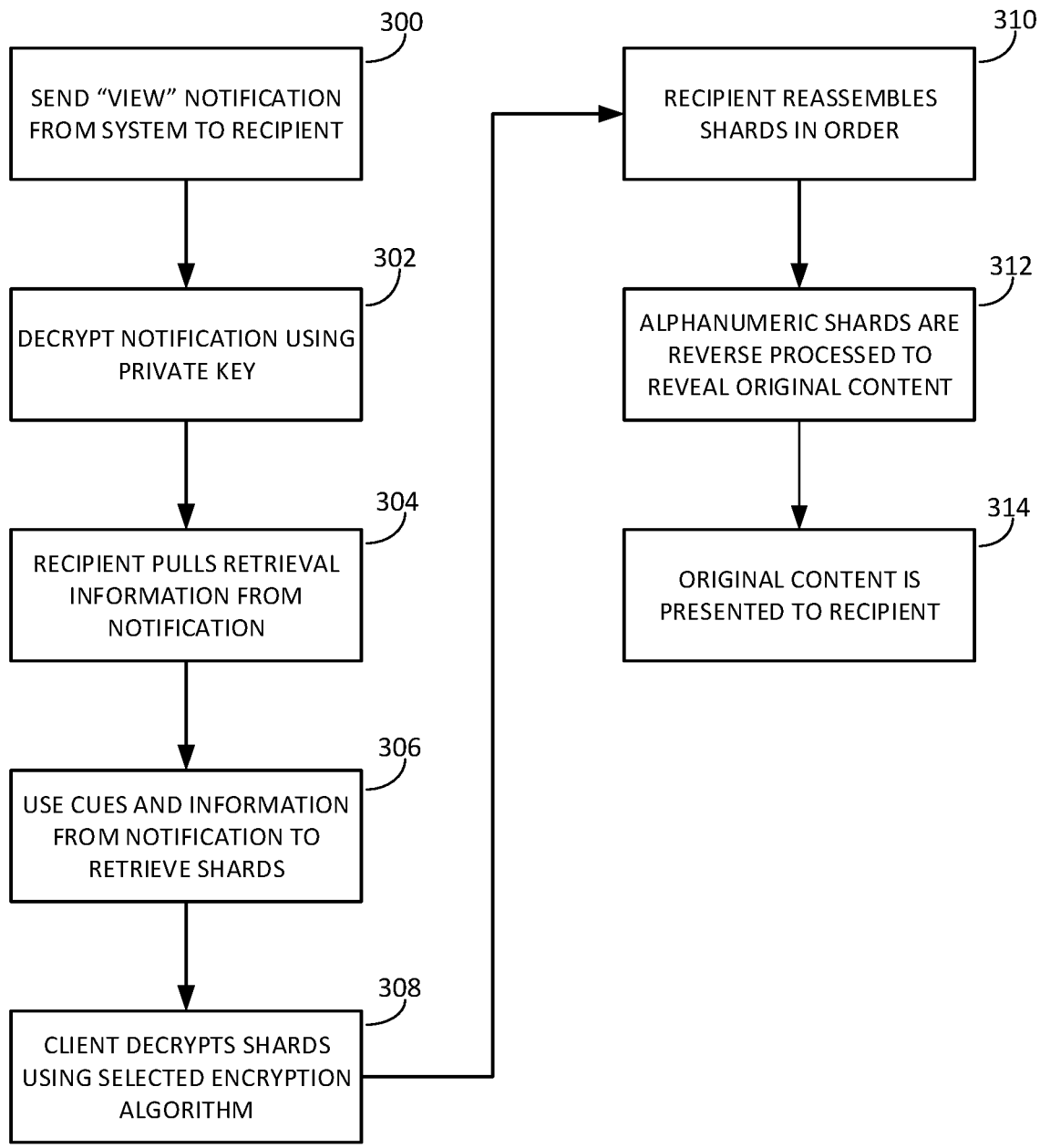
FIG. 3 is a view of the retrieval and decoding of message content process flow consistent with certain embodiments of the present invention.

Turning now to FIG. 3, this figure presents a view of the retrieval and decoding of message content process flow consistent with certain embodiments of the present invention. In an exemplary embodiment, at 300 the combinatorial security system server transmits the previously prepared "right to view" notification to the intended recipient of the message content as supplied by the sender. At 302, the intended recipient opens the "right to view" notification and utilizes the private key of the recipient's public/private key pair to decrypt the information contained in the "right to view" notification. At 304, the recipient imports the information, encryption algorithms, and other data contained within the notification into the computer system associated with the recipient. At 306, the recipient utilizes the location information to retrieve each shard from the "haystack" location where the shard has been stored. The notification also contains the encryption algorithm associated with each shard, the order into which the shards must be placed once decrypted, and the method for processing the resulting alphanumeric string back into the original message content.

At 308, the recipient uses the selected and received encryption algorithms and the identifiers as to which encryption algorithm is associated with which shard to decrypt the received shards. At 310, the recipient uses the received order information from the "right to view" notification to assemble the shards in the correct order. At 312, the recipient reverses the process to translate the alphanumeric string that has been decrypted and reassembled into the original message content. At 314, at the end of the processing steps, the original message content may be presented to the intended recipient in any browser the recipient may desire to use for viewing the message content.

Figure 4:
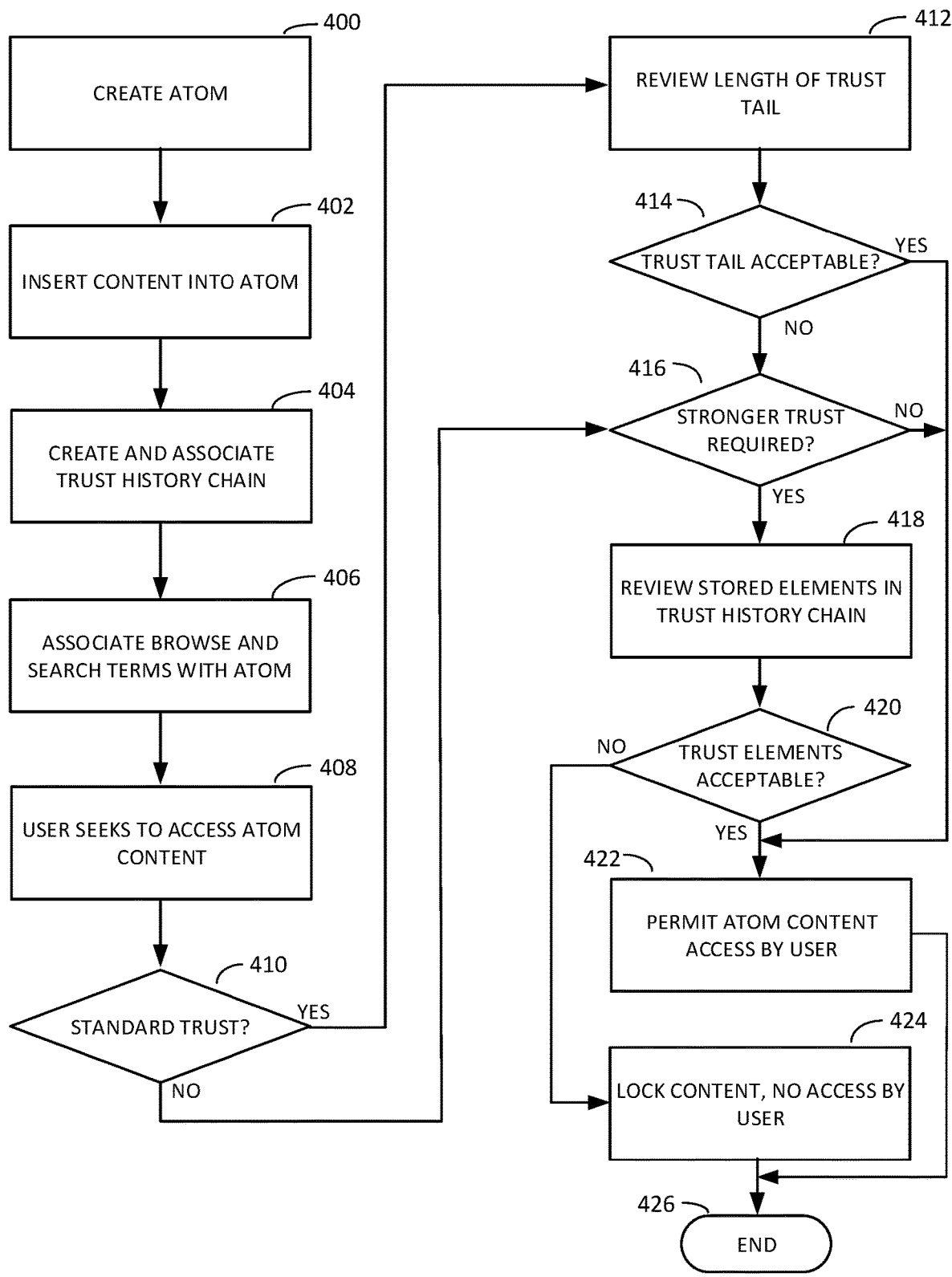
FIG. 4 is a view of the atom creation and atom access process flow consistent with certain embodiments of the present invention.

FIG. 4 this figure presents a view of the atom creation and atom access process flow consistent with certain embodiments of the present invention. In an embodiment, at 400 atoms may be created when the purpose for an atom is realized within the atomic internet. In a non-limiting example, a content atom may be created when a user publishes a piece of content to the atomic internet and the owner wishes to share the content either as freely available content or content that requires payment or other exchange of value to access the content, a user atom may be created with a user establishes a reservoir of collected user data both personal and objective. At 402 content, user information, or tracking and management information, depending upon the atom type, may be inserted into the created atom. At 404 a trust history chain is created and associated with the atom as a trust history tail and trust history of all transactions to be associated with the atom. At 406 a word cloud is created and associated with the atom to facilitate browse and search functions for users that would be interested in the content, information, or other data contained within the atom. At 408 a user of the atomic internet may seek to access an atom to receive the content, information, or other data contained within the particular atom. At 410 a level of trust is required to access any atom and the atom to be accessed may permit access based upon a standard level of trust as a pre-configured trust parameter contained within the structure of the atom. At 412 if the trust level is a standard level of trust or a lower level of trust, the atom being accessed reviews the length of the trust tail associated with the atom seeking to access the content, information, or other data within the atom being accessed. At 414 if the length of the trust tail is of sufficient length, meaning that the number of trusted interactions that the accessing atom has in its trust tail exceeds a pre-configured length parameter deemed acceptable by the atom being accessed, the atom being accessed will accept the request by the accessing atom. At 416 if the trust history tail is insufficient to satisfy the pre-configured length parameter deemed acceptable, the atom being accessed may require an additional trust check to meet a stronger trust parameter requirement. At 418 this stronger trust check may take the form of a review of all of the stored elements in the trust history chain associated with the atom seeking to access the information. At 420 if the atom being accessed determines that the history of the trusted interactions contained within the trust history chain are sufficient to exceed the trust threshold required by the atom being accessed, the atom being accessed will permit access to the content, information, or other data contained within the atom being accessed. If, however, the trust history check and the check of the trust history interactions are each deemed to be insufficient by the atom being accessed, the accessing atom will be locked out and no access to the content, information, or other data contained within the atom being accessed will be permitted. At 426 the interaction ends with access being granted or denied based upon the examination of the trust tail and/or the trust history chain.

It may be noted that the trust history chain for each atom may be established as a chain of transaction blocks similar to a distributed ledger where the blocks are connected to one another through a recursive hash of each block name. The recursive hash utilizes a unique hashing algorithm to create the hash value for a block and places that hash value into the next established block as the first value stored within the block. This process links the transactions in the trust history chain into a structure that cannot be changed without changing every preceding transaction block in the chain, thus providing for strong data security for all transactions and other information contained within the trust history chain.

Figure 5:
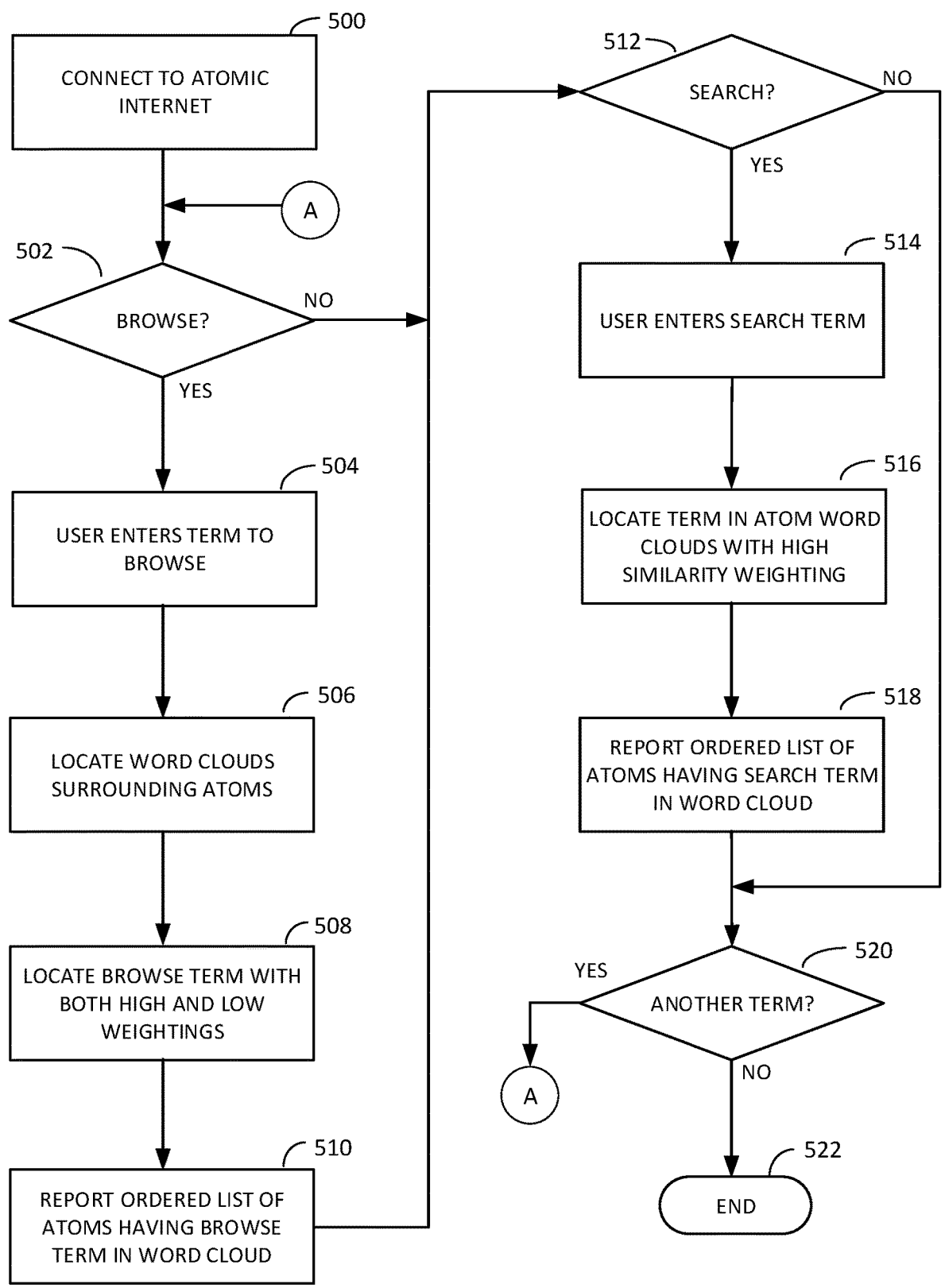
FIG. 5 is a view of the browse and search for content process flow consistent with certain embodiments of the present invention.

FIG. 5 this figure presents a view of the browse and search for content process flow consistent with certain embodiments of the present invention. In an embodiment, when a user is interested in locating content or other information the user begins with connecting to the atomic internet through a standard browser interface at 500. At 502 the user selects the option to browse through the atomic internet. At 504 the user enters a term as a seed for the browsing action. At 506 the browse term is utilized as a seed as the atomic internet locates word clouds surrounding atoms. At 508 the browse term may be located and relevance weightings, determining how closely the located word is to the input browse term submitted by the user. The atomic internet may then create a list of information pages and other resources that contain the browse term where the created list is ordered by the weighting for each information page and/or resource discovered.

If, however, the user is interested in a search to locate a specific information page or other resource the user may make that selection at 512. At 514 the user may enter the search term(s) or phrase(s) that the user is interested in locating. At 516 the search function of the atomic internet may locate the term or phrase being searched in word clouds associated with atoms and determine how similar the located term or phrase is to the term or phrase being searched. Highly similar terms and phrases and/or those that exceed a pre-configured weighting parameter will be collected into search results. At 518 the set of similar and highly weighted terms or phrases may be ordered by weighting and the list of ordered results reported to the user. At 520 at the conclusion of a browse or search action the user may be given the option to browse or search for another term. If the user chooses to browse or search for another term the process returns to step 502. If the user chooses to stop instead the search/browse function closes at 522.

Figure 6:
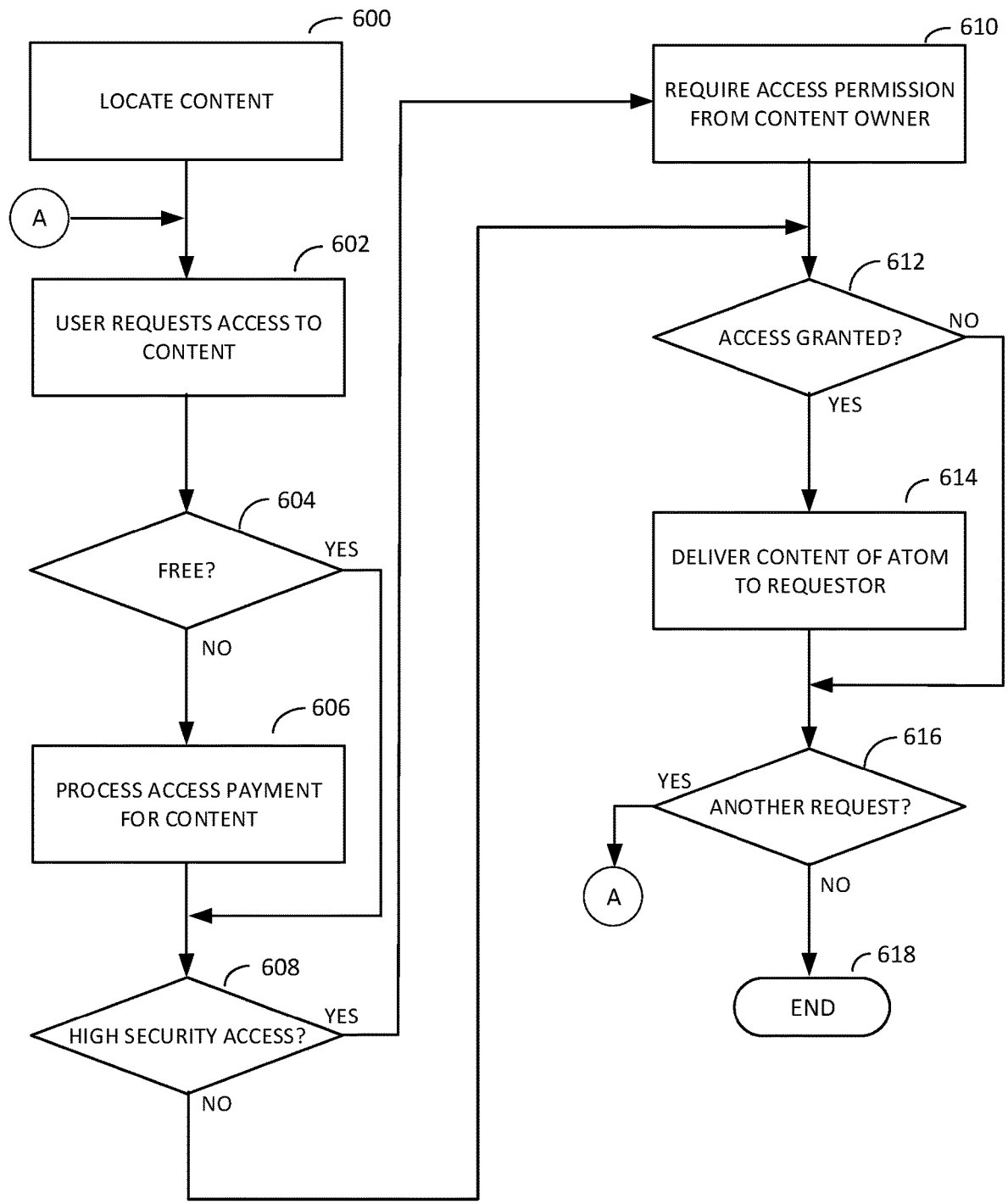
FIG. 6 is a view of the trusted access process flow consistent with certain embodiments of the present invention.

FIG. 6 this figure presents a view of the trusted access process flow consistent with certain embodiments of the present invention. In an embodiment, the user may access the atomic internet to locate a particular atom or set of atoms at 600. Once an atom containing the information, content, or other data in which the user has an interest, the user may request access to the information, content, or other data from the identified atom at 602. At 604 the atomic internet may determine that the owner of the located atom has designated that the content, information, or other data may be freely accessed, subject to trust determinations for the accessing user atom. At 612, if the data may be freely accessed and the accessing user atom meets or exceeds the trust threshold of the atom to be accessed, the user is granted access.

If the owner of the information, content, or other data to be accessed has designated the information, content, or other data as not free, the user atom will be given the option at 606 to provide payment or other value to acquire the information, content, or other data from the located atom. At 608 the user atom attempting to acquire the information, content, or other data may be subject to an additional trust determination for information, content, or other data that may be designated by the owner as sensitive or extremely sensitive. For information, content, or other data designated by an owner such that a higher level of security and trust in the form of a higher trust threshold or requirement to seek permission is required at 610 the user atom may be required to seek such access permission from the content owner.

Regardless of trust or security level, the access request is processed at 612. If the trust level and permission are each granted the information, content, or other data may be copied to the requesting user atom at 614. Upon completion of a request, the atomic internet may ask the user if they have another request at 616. If the user has another request the process returns to step 600. If the user has no further requests, the request function closes at 618.

While certain illustrative embodiments have been described, it is evident that many alternatives, modifications, permutations and variations will become apparent to those skilled in the art in light of the foregoing description.

What is claimed is:

1. A method for secure network interaction, comprising:
   creating an author user atom, wherein the author user atom is a user experience record having an author user atom trust history tail;
   creating one or more content atoms, where each content atom contains user authored content and has a content atom trust history tail, and where the content atom trust history tail is associated with said author user atom;
   collecting interactions and transactions with each content atom associated with said author user atom;
   accumulating and appending a record of each interaction and transaction with a content atom trust history tail of each content atom and the trust history tail of any author user atom connected to said content atom;
   retrieving a pre-configured minimum number of interactions and transactions required to be accumulated in a content trust history tail to establish a minimum trust threshold value;
   approving a second user atom to access a content atom when the trust history tail length connected to any content atom meets or exceeds said established minimum trust threshold value;
   determining a level of compensation required for the second user atom to access a content atom where the level of compensation is increased as a function of the increase in trust as evaluated by an analysis of the length of the content atom trust history tail and a trust history in the content atom trust history tail;
   accessing said content atom when determined compensation required to retrieve said content is provided by the second user atom to the author user atom connected to said content atom; and
   retrieving said content from said content atom and downloading said content contained within said content atom to said second user atom for consumption by a different user than the author.

2. The method of claim 1, further comprising:
   said history tail containing all connections to interactions and transactions with any of said user atoms or content atoms,
   where said history tail is open-ended and encrypted.

3. The method of claim 1, further comprising said content atom is created as a container for text, audio, video, multimedia, presentation, application software, or any other published or active content in a networked environment.

4. The method of claim 3, where said content atom is associated with one or more author user atoms at the time of creation of a content atom.

5. The method of claim 1, further comprising said server determining that a history tail has a non-zero length, where accumulated length is determined by the addition of the content of the interactions and transactions to said history tail and history tail length is a separate parameter.

6. The method of claim 1, where a trust value for a content atom or user atom is determined through review of the trust history tail length and/or the trust history tail contents.

7. The method of claim 1, where determining that a trust value is zero and an atom of any type is untrusted when a trust history tail has zero length.

8. The method of claim 1, further comprising providing a recommendation to a user of how trustworthy a content atom is based at least in part on the trust threshold value associated with said content atom.

9. The method of claim 1, where compensation is automatically charged regardless of trust threshold value prior to a user being granted access to content held within a content atom.

10. The method of claim 1, further comprising utilizing a hash algorithm to perform a hash of the accumulated trust history tail of each content atom and each author user atom and connect the hash value of said content trust history tail to each content atom and the hash value of said author user atom trust history tail to each author user atom.

* * * * *